W. J. MOON.
PIPE STRAIGHTENER.
APPLICATION FILED JULY 16, 1912.
1,071,945.
Patented Sept. 2, 1913.
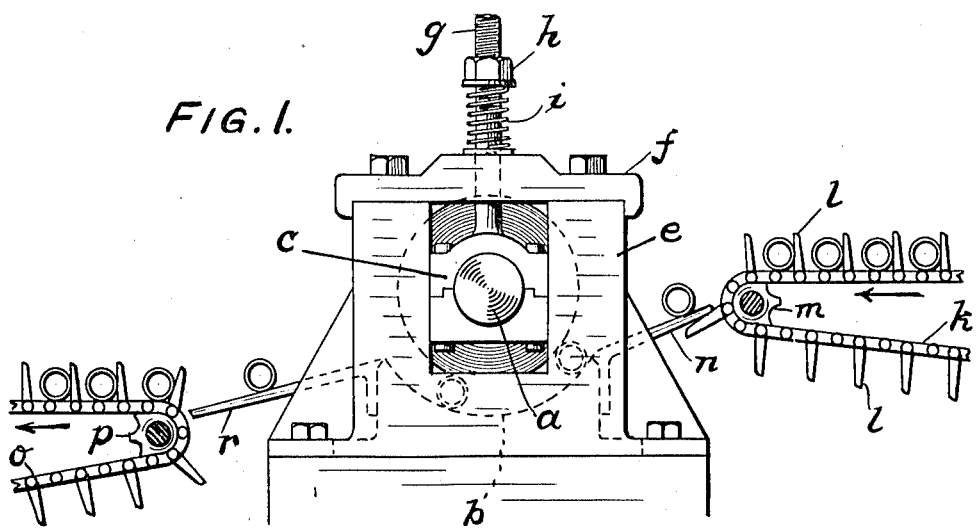
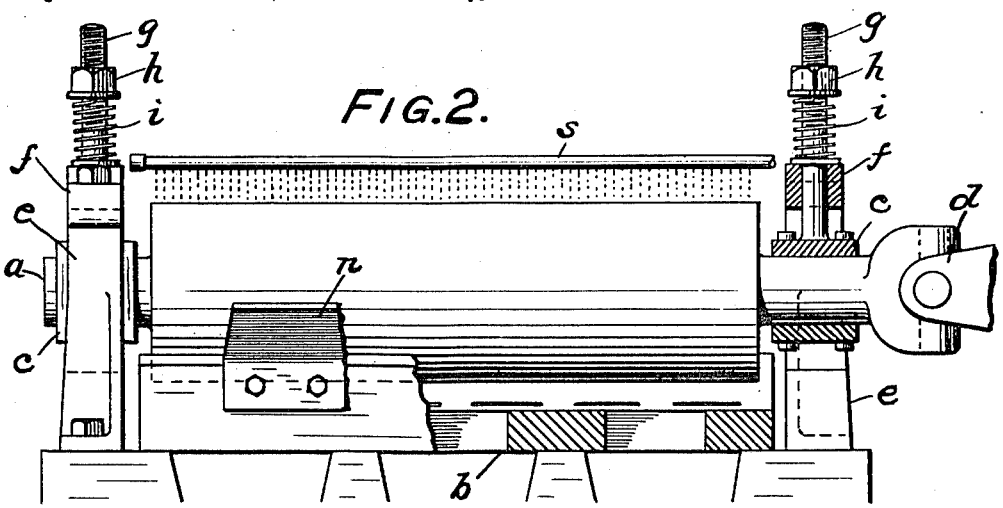
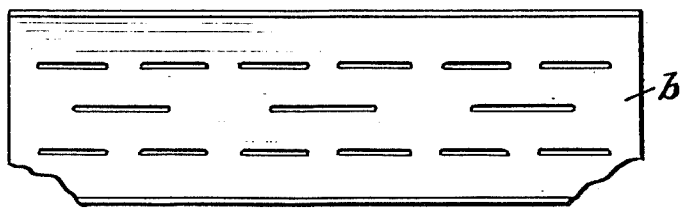
WITNESSES:
Rob't R. Kitchel
E. E. Wall
INVENTOR
Wesley J. Moon
BY Frank S. Busser
ATTORNEY.

UNITED STATES PATENT OFFICE.

WESLEY J. MOON, OF ECONOMY, PENNSYLVANIA.

PIPE-STRAIGHTENER.

1,071,945.  Specification of Letters Patent.  Patented Sept. 2, 1913.

Application filed July 16, 1912. Serial No. 709,634.

*To all whom it may concern:*

Be it known that I, WESLEY J. MOON, a citizen of the United States, residing at Economy, county of Beaver, and State of Pennsylvania, have invented a new and useful Improvement in Pipe-Straighteners, of which the following is a full, clear, and exact description, reference being had to the accompanying drawings, which form a part of this specification.

The object of my invention is to provide an apparatus adapted to straighten pipes in a simple, effective and expeditious manner.

In the drawings: Figure 1 is a side elevation of the apparatus; Fig. 2 is a front elevation partly in section; Fig. 3 is a plan of the roll bed.

$a$ is the roll and $b$ the roll bed. The bed $b$ is stationary and its upper surface is spaced from, and concentric with, the periphery of the roll $a$. The shaft of the roll rotates in bearings $c$ and is driven from a shaft to which it is connected by means of a universal joint $d$. The roll bearings $c$ are slidable in pedestals $e$ to which are bolted caps $f$. Secured to and extending upward from the roll bearings $c$ are hangers $g$. The upper ends of the hangers are threaded to receive nuts $h$. Springs $i$ are confined between nuts $h$ and caps $f$.

$k$ is an endless delivery conveyer, the same comprising a sprocket chain having flights $l$ between which the pipes are carried. One end of the delivery conveyer is shown as passing around a driving sprocket wheel $m$.

$n$ is a delivery chute between the discharge end of the delivery conveyer and the side of the roll bed. This chute has a downwardly extending flange secured to the side wall of the roll bed $b$.

$o$ is an endless discharge conveyer similar in construction to the delivery conveyer and driven from the sprocket wheel $p$.

$r$ is a discharge chute between the receiving end of the discharge conveyer and the side of the roll bed. This chute also has a downwardly-extending flange secured to the side of the roll bed.

Arranged over the roll $a$ is a line of pipe $s$ extending longitudinally of the roll and having perforations through which water is discharged from the pipe evenly along and upon the roll. The roll bed $b$ is provided with slits or perforations through which the water and scale are discharged. By adjusting the nuts $h$ the distance between the roll $a$ and the bed $b$ may be varied from one quarter of an inch to four inches dependent upon the diameter of the pipe to be straightened. The pipes are delivered, while they are yet hot from the size rolls, to the delivery conveyer $k$, whence they are discharged onto the chute $n$ and thence pass into the space between the roll $a$ and the bed $b$. The roll $a$ transfers the pipes from one side to the other of the bed $b$. During the passage of the pipes between the roll and its bed they are repeatedly turned about their axes and eventually straightened. They are finally discharged onto the chute $r$ and thence pass to the discharge conveyer $o$.

Having now fully described my invention, what I claim and desire to protect by Letters Patent is:

1. In a pipe straightener, the combination with a horizontally arranged roll and means to rotate the same, of bearings in which the roll rotates, means for spraying water upon the roll, a concave roll bed, arranged beneath the roll, having perforations through which the water and scale are discharged, and pedestals in which the bearings are freely movable vertically so as to permit the pipes to pass between the roll and bed under the yielding pressure of the roll.

2. In a pipe straightener, the combination with a roll, of bearings in which the roll shaft rotates, pedestals in which said bearings are vertically movable, caps secured to the pedestals, hangers extending upward through the caps, nuts threaded on the hangers, springs confined between the caps and the nuts, and a concave roll bed arranged beneath the roll.

3. In a pipe straightener, the combination with a roll, of bearings in which the roll shaft rotates, pedestals in which said bearings are vertically movable, caps secured to the pedestals, hangers extending upward through the caps, nuts threaded on the hangers, springs confined between the caps and the nuts, means for spraying water upon the roll, a concave roll bed, arranged beneath the roll, having perforations through which the water and scale are discharged, means to convey pipes to the space between the roll and bed, and means to receive and convey away the pipes discharged from between the roll and bed.

In testimony of which invention, I have hereunto set my hand, at Ambridge, Pa., on this tenth day of July, 1912.

WESLEY J. MOON.

Witnesses:
K. R. WAGNER,
W. F. DICKSON.